UNITED STATES PATENT OFFICE.

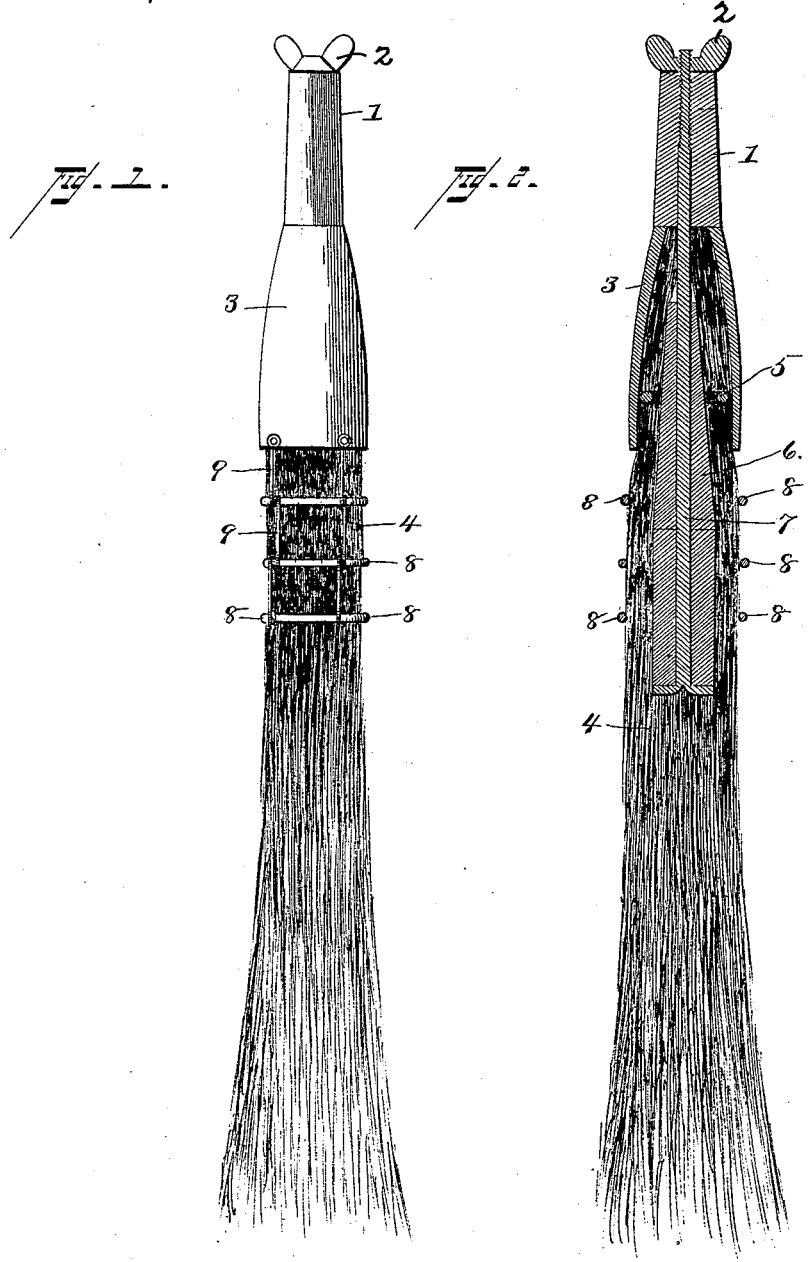

JESSE MONROE MEADOR, OF NEW CONCORD, KENTUCKY.

BROOM.

SPECIFICATION forming part of Letters Patent No. 449,550, dated March 31, 1891.

Application filed July 7, 1890. Serial No. 357,938. (No model.)

*To all whom it may concern:*

Be it known that I, JESSE MONROE MEADOR, a citizen of the United States, and a resident of New Concord, in the county of Calloway and State of Kentucky, have invented certain new and useful Improvements in Brooms; and I do hereby declare that the following is a full, clear, and exact description of the invention, which will enable others skilled in the art to which it appertains to make and use the same, reference being had to the accompanying drawings, which form a part of this specification.

My invention relates to improvements in brooms, the object being to provide a construction in which the straw when worn can be readily removed from the handle and new straw inserted.

In the accompanying drawings, Figure 1 is a side elevation of a broom constructed according to my invention. Fig. 2 is a central sectional view of the same.

In the said drawings, the reference-numeral 1 designates a broom-handle having a central aperture extending through it and provided at its upper end with a nut 2, screw-threaded to receive a corresponding screw-rod, by which the broom-head is secured thereto.

The numeral 3 represents a receiver, preferably made of metal and which is funnel-shaped, as seen in the drawings, and of a size corresponding with the straw comprising the broom-head. This receiver may be round or flat, according to the desired shape of the head.

The numeral 4 designates the straw with a ring 5, which holds it together.

6 designates a wedge, corresponding in shape and size with the receiver, and is provided with a screw-rod 7, which is inserted in the broom-handle. This wedge is of a length greater than that of the receiver, so that when inserted therein it will project some distance outside.

8 designates a holder, consisting of a series of connected rings secured to the receiver by means of wires 9, and serves to hold the straw in position around the exposed end of the wedge.

The operation will readily be understood. A sufficient quantity of straw to form a head with the ring 5 encircling the same, so as to hold it together, is inserted in the holder 8 and receiver 3. The wedge 6 is next driven in with the screw-threaded rod passing through the other end of the receiver, said rod being secured in the end of the handle.

From the above it will be seen that a simple and efficient device is provided, and that the broom-head can be readily removed from the handle and replaced when desired.

Having thus described my invention, what I claim is—

A broom consisting of the handle having a central bore and provided with a nut at its upper end, a screw-threaded rod, a receiver, a holder secured thereto, consisting of a series of annular rings connected together by wires, a wedge through which the screw-rod passes, and the straw and the ring encircling the same, substantially as described.

In testimony that I claim the foregoing as my own I have hereunto affixed my signature in presence of two witnesses.

JESSE MONROE MEADOR.

Witnesses:
J. W. STEWART,
F. M. BEAL.